United States Patent [19]

Giesler

[11] 4,264,404

[45] Apr. 28, 1981

[54] CUSHION FOR LAMINATING OPERATIONS

[75] Inventor: Harold C. Giesler, Westchester, Ohio

[73] Assignee: Formica Corporation, Stamford, Conn.

[21] Appl. No.: 96,584

[22] Filed: Nov. 21, 1979

[51] Int. Cl.[3] ........................ B32B 31/00; B32B 7/02; B32B 9/00; B32B 27/10

[52] U.S. Cl. .................................... 156/537; 100/296; 156/289; 156/323; 428/214; 428/339; 428/412; 428/513

[58] Field of Search ............... 428/153, 314, 412, 512, 428/513, 213, 214, 154, 523, 339; 156/288, 289, 323, 334, 537; 100/295, 296, 297

[56] References Cited

U.S. PATENT DOCUMENTS

| | | | |
|---|---|---|---|
| 3,297,515 | 1/1967 | Regenstein et al. | 428/512 |
| 3,536,563 | 10/1970 | Brandts et al. | 428/153 |
| 3,684,613 | 8/1972 | Frohning | 156/323 |
| 3,701,706 | 10/1972 | Giddings et al. | 428/503 |
| 3,723,220 | 3/1973 | Scher et al. | 156/323 |
| 3,997,696 | 12/1976 | Jaisle et al. | 156/323 |

*Primary Examiner*—William J. Van Balen

*Attorney, Agent, or Firm*—Paul W. Leuzzi, II

[57] ABSTRACT

Cellulosic paper sheets interleaved with sheets of a thermoplastic material having a glass transition point below about 100° C. and a melting point of about 125° C. or more provide a cushion for use in laminating operations. The thermoplastic sheets employed in the cushion have an individual thickness ranging from about 2 to 20 mils and a combined thickness of at least 5 mils. Such a cushion provides a long-term, reuseable cushion for laminating operations.

8 Claims, No Drawings

CUSHION FOR LAMINATING OPERATIONS

BACKGROUND OF THE INVENTION

Laminates have been employed as surface materials for application to tables, vanities, vertical wall coverings, door coverings, and the like for a number of years. Conventionally, these laminates are prepared by assembling, in superimposed relationship, a core layer which consists of a plurality of kraft paper sheets impregnated with a thermosetting phenol-formaldehyde resin and a decorative sheet that is impregnated with a thermosetting resin which does not undergo noticeable deterioration in color, such as darkening, upon any subsequent laminating operations. Typical resins used in the decorative sheet include, but are not limited to, melamine-formaldehyde resins, epoxy resins, unsaturated polyester resins, and urea resins. The decorative sheet itself is conventionally an alpha-cellulose paper sheet which has been dyed, pigmented or upon which there is imparted some design or pattern. Frequently, superimposed above the decorative sheet there is placed an overlay sheet. The overlay sheet is a highly refined alpha-cellulose paper sheet unpigmented, but impregnated with a color-stable thermosetting resin.

The assembled laminate is heat and pressure consolidated under conventional conditions of pressure and temperature to produce a unitary laminated product. During heat and pressure consolidation, the arrangement of plates, cushions, sheets and the laminate assembly must be such so as to most effectively and uniformly distribute the heat and pressure to the laminate. The cushion in such an arrangement acts to absorb thermal shock and shear stress during pressing thereby aiding the uniform distribution of heat and pressure to the laminate. The cushion employed in this arrangement has traditionally been comprised of a plurality of unimpregnated kraft paper sheets. Cushions of this type at the top of the press pack have an average useful life of 5 pressing runs. When employed at the bottom of the press pack, their useful life has an upper limit of approximately 25 pressing runs. When used at the top of the press pack, their useful life is somewhat shorter due to excessive handling because, after each run, they are inspected for damage. If no damage is discovered, the top-used cushions are either used again as the top cushion or reshuffled into the bottom of the press pack. Because of this, the cost of cushions to the laminating industry is presently approaching three million dollars annually and escalating. Additionally, the conventional kraft cushions currently employed oftimes result in a peripheral gloss around the edges of the laminate, called the picture frame effect, requiring the edges to be trimmed off of the laminates so produced before they are sold. This additional trimming step contributes to the cost of laminate manufacture especially when a paper texturizer has been employed. Occasionally, water marks will also result from the use of these conventional cushions in that the uniformity of the heat and pressure fluctuates when they have been used a number of times.

Thus, there exists the need for a cushion that exhibits a greater useful life and yet continues to effectively and uniformly distribute heat and pressure to the decorative laminate assembly. Accordingly, the provision for a more economical and efficient cushion would fulfill a long-felt need and constitute a significant advance in the art.

SUMMARY OF THE INVENTION

The present invention provides for a novel cushion for use in laminating operations and a process of producing a laminate wherein such a cushion is employed. The cushion enables a uniform distribution of heat and pressure to the laminate, eliminates the peripheral gloss and water markings of the laminates prepared, and has a useful life of over 100 pressings. Surprisingly, the instant cushion also aids in the elimination of flash, dirt and foreign particles which are attracted to the thermoplastic material and are transferred during subsequent pressings to the laminate. The cushion is easily handleable and provides for a cost reduction of up to about 80% over the conventional cushions.

DETAILED DESCRIPTION OF THE INVENTION

In accordance with the instant invention, there is provided a laminating cushion comprising at least two cellulosic paper sheets and at least one thermoplastic sheet having a glass transition point below about 100° C. and a melting point of about 125° C. or more wherein the thermoplastic sheets have an individual thickness ranging from about 2 to 20 mils and a combined thickness greater than 5 mils and wherein the individual thermoplastic sheets are interleaved between the cellulosic paper sheets. Additionally, there is provided a process for producing a laminate comprising placing an assembly comprising, in superimposed relationship, (1) a caul plate of a laminate press, (2) a cushion, (3) a release sheet, (4) a thermosetting resin impregnated laminate assembly and (5) a press plate within a laminate assembly press and thereafter effecting consolidation of the laminate assembly by applying sufficient heat and pressure to thermoset the resins impregnating the laminate assembly wherein the cushion employed comprises at least two cellulosic paper sheets and at least one thermoplastic sheet wherein the thermoplastic sheets have an individual thickness ranging from about 2 to 20 mils and a combined thickness greater than about 5 mils and wherein the individual thermoplastic sheets are interleaved between the cellulosic paper sheets.

Suitable cellulosic paper sheets include, but are not limited to, cellulosic paper sheets prepared from kraft, acid sulfite, oxygen, soda and neutral sulfite pulping processes. Preferably, they are of the type conventionally employed in laminate cushions, i.e., a kraft paper sheet of about a 30 to 130 pound basis weight per 3000 square foot ream available commercially in plentiful supply, but may also include alpha-cellulose sheets and especially those alpha-cellulose sheets which were formed into decor sheets but are not employed as such because the decorative design thereon becomes obsolete.

Suitable thermoplastic material includes sheets of polypropylene, polycarbonate, polystyrene and the like. These thermoplastic sheets exhibit a glass transition point below about 100° C. and a melting point of about 125° C. or more. These thermoplastic sheets should have a thickness of about 2 to 20 mils. The preferred mode of the instant invention is to employ 3 or more thermoplastic sheets within the cushion with each individual sheet having a thickness of from about 3 to 10 mils so that the combined thickness of the thermoplastic sheets in the cushion is greater than about 9 mils. Preferably, no more than 10 cellulosic paper sheets and 9 thermoplastic sheets are interleaved in a cushion. However, in special applications, it may become necessary to use about 20, 30, or 40 or more cellulosic paper sheets interleaved with thermoplastic sheets. It has been found that by placing thermoplastic sheets together, rather than interleaving them between cellulosic paper sheets, so that their adjacent thickness exceeds 20 mils creates a cushion that is too fluid and thus does not uniformly distribute the exerted pressure to the thermosetting resin impregnated laminate assembly. However, placing thermoplastic sheets together so that their adjacent thickness is less than or equal to 20 mils does not severely effect the laminating process. However, when these thermoplastic sheets are used alone, static electricity is generated and attracts flash and other laminate debris thereby damaging laminates produced therefrom. Thus, interleaving of thermoplastic sheets and cellulosic paper sheets remains the preferred embodiment.

The laminate cushion must have at least two cellulosic paper sheets and at least one thermoplastic sheet. Generally, the laminate cushion will consist of one less sheet of thermoplastic material sheet than there are sheets of cellulosic paper. In the preferred configuration there are four sheets of cellulosic paper having three sheets of thermoplastic material interleaved between the cellulosic paper sheets. Although the laminate cushion itself need not be prepressed before use in the laminating process, because pressing thereof occurs during laminate production, it is preferred that such prepressing be conducted so as to facilitate handling of the cushion per se.

In some instances, it may be desirable to lightly bond the bottom cushion to the caul plate. In these instances, a hot melt adhesive is placed between the caul plate and the bottom cushion so as to absolutely assure that no accumulation of foreign particles occurs between the caul plate and bottom cushion. In the preferred instances, polyethylene is employed as the hot melt adhesive since it can easily be stripped from the caul plate when the cushion subsequently becomes physically damaged or of no further use.

To manufacture high-pressure laminates, there is exerted upon the assembly a pressure of from about 800 to 1600 psi at temperatures ranging from about 120° C. to 180° C. for approximately 30 minutes. Low-pressure laminates are prepared under substantially identical conditions except that a pressure from about 200 to 600 psi is exerted and the time of pressing is much shorter. The press plates employed during these pressing operations range from polished stainless steel plates to textured plates which impart a textured or embossed surface to the laminate.

The following specific examples illustrate certain aspects of the present invention and, more particularly, point out advantages provided by the present invention. However, the examples are set forth for illustration only and are not to be construed as limitations on the present invention except as is set forth in the appended claims.

COMPARATIVE EXAMPLE A

Placed in superimposed relationship upon the caul plate of a laminate assembly press are five unimpregnated kraft paper sheets functioning as the bottom cushion; a first coated release sheet; a first stainless steel press plate; a first texturizer sheet; a first laminate assembly; a second coated release sheet; a second laminate assembly; a second texturizer sheet; a second stainless steel press plate; a third coated release sheet; five unimpregnated kraft paper sheets functioning as the top cushion; and the press platen. The laminate assembly consists of a core layer of phenol-formaldehyde resin impregnated kraft paper sheets, a decor sheet impregnated with a melamine-formaldehyde thermosetting resin and an alpha-cellulose overlay sheet impregnated with a melamine-formaldehyde thermosetting resin. The entire assembly is subjected to conventional high-pressure lamination and allowed to cool. Inspection reveals peripheral gloss of the laminates and an early indication of the loss of cushionability of the top and the bottom cushion.

COMPARATIVE EXAMPLE B

Following the procedure of Comparative Example A, the same top and bottom cushions are employed in a series of laminations replacing the release sheets, texturizer sheets and laminates after each operation. After 18 laminating runs, the top and bottom sheets show signs of wear and requires replacement and the laminates produced in the last runs exhibit water marks from non-uniform heat and pressure distribution during pressing.

EXAMPLE 1

Following the procedure of Comparative Example A, there is employed as the top and bottom cushion a cushion comprising, in superimposed relationship, a first sheet of kraft paper sheet; a first sheet of polypropylene; a second sheet of kraft paper sheet; a second sheet of polypropylene; a third sheet of kraft paper sheet; a third sheet of polypropylene and a fourth sheet of kraft paper. The polypropylene sheets employed individually have a thickness of 3 mils. Inspection after pressing shows no wear on either cushion and no sign of peripheral gloss on the laminates produced.

EXAMPLE 2

The procedure of Example 1 is followed in a series of laminate pressings employing the same cushions in each pressing. After 134 pressings, the top and bottom cushions still show no sign of deterioration which would necessitate their replacement. The laminates so produced are substantially free of water marks and peripheral gloss.

COMPARATIVE EXAMPLE C

Following the procedure of Comparative Example A, there is employed as the top and bottom cushions five sheets of polypropylene each. The polypropylene sheets employed are individually 7 mils in thickness. Inspection reveals that static attributable to the polypropylene sheets has attracted foreign particles that mar the laminate surface.

EXAMPLE 3

When the procedure of Example 1 is followed in every material detail except that there is employed as the top and bottom cushion a cushion comprising, in superimposed relationship, a first kraft paper sheet; a first polypropylene sheet; and a second kraft paper sheet, and the polypropylene sheet employed has a thickness of 18 mils, inspection reveals substantially equivalent results to that obtained in Example 1.

EXAMPLE 4

When the procedure of Example 3 is followed in a series of laminations employing the same cushions, results substantially equivalent to Example 2 are obtained.

EXAMPLE 5

When the procedure of Example 1 is followed in every material detail except that there is employed as the top and bottom cushion a cushion comprising eight kraft paper sheets with seven polypropylene sheets each individually 4 mils in thickness interleaved between the kraft paper sheets substantially equivalent results are obtained to those reported in Example 1.

EXAMPLE 6

When a series of laminations employing the cushions of Example 5 are run, results substantially equivalent to Example 2 are obtained.

EXAMPLE 7

When the procedure of Example 1 is followed in every material detail except that there is employed as the top and bottom cushion a cushion comprising two acid sulfite paper sheets with one 10-mil polycarbonate sheet interleaved between the paper sheets substantially equivalent results are obtained to those reported in Example 1.

EXAMPLE 8

When a series of laminations employing the cushions of Example 7 are run, results substantially equivalent to Example 2 are obtained.

EXAMPLE 9

When the procedure of Example 1 is followed in every material detail except that there is employed as the top and bottom cushions a cushion comprising four obsolete alpha-cellulose decor paper sheets with three 4-mil polypropylene sheets interleaved between the obsolete alpha-cellulose decor paper sheets, substantially equivalent results are obtained to those reported in Example 1.

EXAMPLE 10

When the procedure of Example 1 is followed in every material detail except that there is employed as the top and bottom cushions a cushion comprising six kraft paper sheets with five 5-mil polystyrene sheets interleaved between the kraft paper sheets, substantially equivalent results are obtained to those reported in Example 1.

What is claimed is:

1. A pressure cushion for use in heat and pressure laminating operations comprising at least two cellulosic sheets and at least one thermoplastic sheet having a glass transition point below 100° C. and a melting point of about 125° C. or more wherein the thermoplastic sheets have an individual thickness ranging from about 2 to 20 mils and a combined thickness greater than about 5 mils and wherein the individual thermoplastic sheets are interleaved between the cellulosic paper sheets.

2. The cushion of claim 1 wherein the thermoplastic sheets individually have a thickness from about 3 to 10 mils and a combined thickness of at least 9 mils.

3. The cushion of claim 1 wherein the cushion comprises four cellulosic paper sheets having three thermoplastic sheets interleaved between the cellulosic paper sheets.

4. The cushion of claim 1 wherein cellulosic paper sheets are kraft paper sheets and said thermoplastic sheets are polypropylene sheets.

5. The cushion of claim 1 wherein the thermoplastic sheets employed in said cushion have a glass transition point between about −50° C. to 100° C. and a melting point between about 125° C. to 250° C.

6. An assembly comprising, in superimposed relationship, (1) a caul plate of a laminate assembly press; (2) a cushion; (3) a release sheet; (4) a thermosetting resin impregnated laminate assembly and (5) a press plate wherein the cushion comprises the cushion of claim 1.

7. A process for producing a laminate comprising placing an assembly comprising, in superimposed relationship, (1) a caul plate of a laminate assembly press; (2) a cushion; (3) a release sheet; (4) a thermosetting resin impregnated laminate assembly and (5) a press plate within a laminate assembly press and thereafter effecting consolidation of the laminate assembly by applying sufficient heat and pressure to thermoset the resins impregnating the laminate assembly wherein the cushion employed comprises the cushion of claim 1.

8. The cushion of claims 6 or 7 comprising four kraft paper sheets having three polypropylene sheets interleaved between the kraft paper sheets.

* * * * *